Dec. 20, 1932.  W. H. HIMMELBERGER  1,891,711
TRAILER COUPLING
Filed June 5, 1931

Inventor
William H. Himmelberger,
By Samuel H. Davis,
Attorney

Patented Dec. 20, 1932

1,891,711

UNITED STATES PATENT OFFICE

WILLIAM H. HIMMELBERGER, OF LANSING, MICHIGAN, ASSIGNOR TO LANSING COMPANY, OF LANSING, MICHIGAN, A CORPORATION OF MICHIGAN

TRAILER COUPLING

Application filed June 5, 1931. Serial No. 542,414.

This invention relates to trailer couplings, and has for its object the production of devices for connecting any vehicular structures to which it may be applied, and having parts of special construction and arrangement whereby it is believed a particularly durable, convenient and effective coupling is made which cannot get out of order and by the use of which coupling may be readily effected whatever may be the relative positions of the trailer or trucks.

Figure 1:
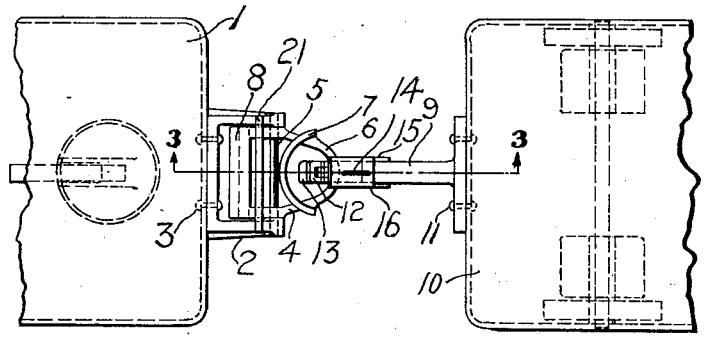
Figure 2:
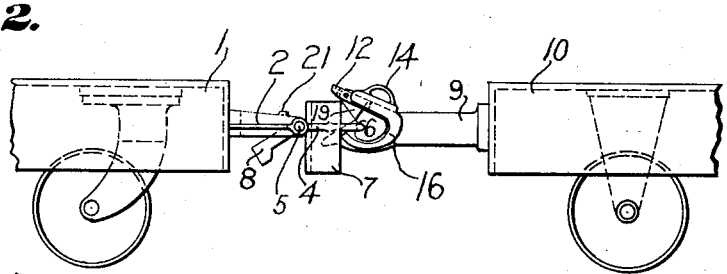
Figure 3:
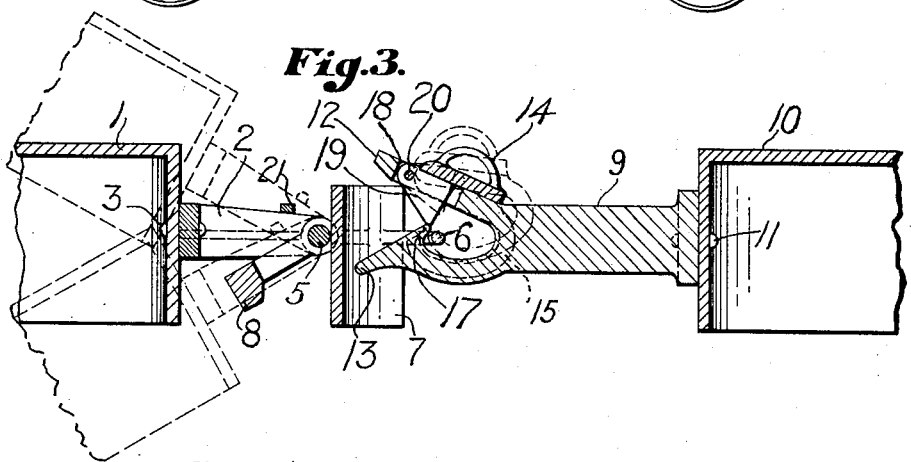
Figure 4:
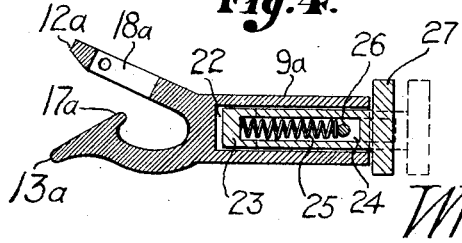

In the accompanying drawing are illustrated the special parts with the formation and disposition thereof. Fig. 1 shows a top view of all parts assembled. Fig. 2 is a side view. Fig. 3 is a side view, slightly enlarged showing the trailers one inclined in position with respect to the other. Fig. 4 is a section lengthwise of the jaw member showing a modification thereof.

Throughout the drawing and description the same number is used to refer to the same part.

Considering the drawing it will be noted that the jaw member has a hook or lug arrangement on the lower jaw, and this hook hauls all the load. The term draft lug is used for the purposes of explanation in this description. It will be further observed that the hook member carries a latch block that extends downwardly between the jaws and operates to retain the ring link in its engagement with the draft hook or lug and when raised permits the release of the link, but the latch is not depended upon to do any hauling. It will be further seen that the coupling constructed in accordance with this invention, has two fingers running down on each side of the jaw member, and the fingers are rigidly connected to a hand hold which is also a portion of the movable part of the arrangement for keeping the ring link from coming out of its engagement with the jaw. When the hand hold is lifted it raises the latch block or dog mentioned above pivotally supported in the slot of the jaw and usually forming an integral portion with the hand hold plate. The plate or base of the hand hold is located and is pivotally supported on the jaw slot, and when the operator lifts the hand hold and plate he not only raises the latch block or dog away from the link, but also raises the fingers which pass down at the sides of the jaw of the coupling into contact with the ring end portion of the link which throws the ring clear of the jaw and the draft lug or hook.

In the drawing the truck or trailer 1 is the one which is being drawn along. The truck has on the end a yoke 2 secured by bolts 3. The yoke carries a link comprising the body 4, held pivotally to the yoke by the pin 5, and the link terminates in a partial ring 6. The link carries the vertical and transversely curved buffer plate 7. The link is continued rearwardly of the pin 5 in an extended and weighted balancing portion 8.

This invention comprises also a member 9 secured to the leading truck 10 by the bolts 11, and the member 9 has the spaced jaws 12 and 13. Resting upon the upper jaw 12 is the base or plate of a hand hold 14, and as usually formed the fingers 15 and 16 are integral with the hand hold. The fingers pass down at the sides of the member 9 as shown, and if the hand hold is in its lowered position as shown in Fig. 2 the ends of the two fingers lie just below the sides of the ring portion 6 of the link. The lower jaw 13 of the head has a draft lug or hook 17 that engages the ring end 6 of the link, as best shown in Fig. 3. The upper jaw 12 has a slot 18 and in the slot is the latch block or dog 19 pivotally secured in the slot by the pin 20.

It will be understood also from Fig. 3, that the link by reason of its pivotal support 5 is free to be thrown up and down as the trucks are moving, and it is desired that the weighted extension 8 to the rear of the pin 5 shall not be thrown too high. Therefore a stop bar 21 is secured across the top of the yoke 2 in order that any upward movement of the part 8 of the link may be arrested.

Considering the modification illustrated in Fig. 4, the member 9a and the jaws 12a, 13a, as well as the hook or lug 17a on the lower jaw, and the slot 18a in the upper jaw are each the same in structure and location as before. It is desired that the jaw member shall yield somewhat under the draft stress or strain, and there is provided an inner longitudinal chamber 22 within which is a movable body 23 having a hollow interior 24 containing a coil spring 25. One end of the spring abuts against the end of the hollow or cavity 24, and the opposite end bears against a pin 26 passed transversely through the body 23, and into the member 9a on both sides. The base 27 of the body 23 is intended to be bolted to the truck in the same manner as shown for the member 9 in the Figs. 1, 2 and 3. It will be now seen that if the jaw member as set forth in the Fig. 4 be drawn upon, the jerk or jolt will be cushioned by the coil spring 25. This is advantageous to prevent breakage of the parts of the coupling if the train of trucks or trailers is long and the effort to start them considerable.

In explaining the operation of this invention, attention is directed to the fact that instead of having a bail for coupling into the jaw member of the coupler, there is provided a ring device with one-half of it being circular and the other half being provided with a bumper having portions projecting upwardly and downwardly which keeps the jaw in a certain position on the ring part of the link at all times. It will be noted that those projecting portions curve practically on the same radius with the ring so that the end of the lower jaw is arranged somewhat close to the curved bumper whatever may be the position of the two trucks, so that the jaw member cannot be thrown violently sidewise or endwise very far. By reason of the curved bumper illustrated and described herein it is practicable to couple the trucks at a greater angle than can be done by using any other coupling of like nature with which this applicant is acquainted. The weighted and extended rear portion of the link keeps the ring end always in a horizontal position regardless of what positions the trucks stand in. As previously explained herein, the latch block or dog retains the ring end of the link in its engagement with the draft lug of the lower jaw, but when the hand hold is raised, the latch block rises also away from the ring, and at the same time the side fingers lift the ring end free from the lug so that the trucks may be separated. To couple the trucks, they are simply pushed together, and the coupling act is automatic as will be readily discerned from the drawing and the foregoing description.

Having now described this invention and explained its operation, I claim:—

1. In a trailer coupling, the combination of a member having spaced upper and lower jaws, the said lower jaw having a draft lug, the said upper jaw having a slot formed lengthwise therein, a coupling link adapted to engage the said draft lug, and means pivotally supported in the said jaw slot and operable from above said member and having a latch block extending downwardly between the said jaws and adapted to retain the said link in its engagement with the said draft lug, the said pivotal means having also fingers rigidly attached thereto and arranged at the sides of the said member and adapted to act upon the said link to release the link.

2. In a trailer coupling, the combination with a member adapted to be secured to a truck and having divergent upper and lower jaws, said upper jaw having a slot, a pivoted latch block located in said slot, a hand hold whereby said block may be pivotally raised, said hand hold by contact with said upper jaw limiting the downward movement of the block, said hand hold having spaced fingers normally resting on opposite sides of the said lower jaw of said member, and a yoke adapted to be secured to an adjacent truck and having a link extending between said divergent jaws and above the fingers of said latch block.

In testimony whereof I affix my signature.

WILLIAM H. HIMMELBERGER.